United States Patent
Arimilli et al.

[11] Patent Number: 6,145,059
[45] Date of Patent: *Nov. 7, 2000

[54] CACHE COHERENCY PROTOCOLS WITH POSTED OPERATIONS AND TAGGED COHERENCY STATES

[75] Inventors: Ravi Kumar Arimilli, Austin; John Steven Dodson, Pflugerville; Jerry Don Lewis, Round Rock, all of Tex.

[73] Assignee: International Business Machines Corporation, Armonk, N.Y.

[ * ] Notice: This patent is subject to a terminal disclaimer.

[21] Appl. No.: 09/024,383

[22] Filed: Feb. 17, 1998

[51] Int. Cl.⁷ .................................................... G06F 12/16
[52] U.S. Cl. .......................... 711/143; 711/119; 711/122; 711/141
[58] Field of Search .................................... 711/119, 122, 711/141, 143

[56] References Cited

U.S. PATENT DOCUMENTS

| | | | |
|---|---|---|---|
| 5,671,391 | 9/1997 | Knotts | 711/143 |
| 5,749,095 | 5/1998 | Hagersten | 711/141 |
| 5,832,276 | 11/1998 | Feiste et al. | 710/240 |
| 5,903,908 | 5/1999 | Singh et al. | 711/122 |
| 5,946,709 | 8/1999 | Arimilli et al. | 711/119 |

*Primary Examiner*—John W. Cabeca
*Assistant Examiner*—Christian P. Chace
*Attorney, Agent, or Firm*—Volel Emile; Felsman, Bradley, Vaden, Gunter & Dillon, LLP

[57] ABSTRACT

A method of avoiding deadlocks in cache coherency protocol for a multi-processor computer system, by loading a memory value into a plurality of cache blocks, assigning a first coherency state having a higher collision priority to only one of the cache blocks, and assigning one or more additional coherency states having lower collision priorities to all of the remaining cache blocks. Different system bus codes can be used to indicate the priority of conflicting requests (e.g., DClaim operations) to modify the memory value. The invention also allows folding or elimination of redundant DClaim operations, and can be applied in a global versus local manner within a multi-processor computer system having processing units grouped into at least two clusters.

16 Claims, 5 Drawing Sheets

CACHE COHERENCY PROTOCOLS WITH POSTED OPERATIONS AND TAGGED COHERENCY STATES

BACKGROUND OF THE INVENTION

1. Field of the Invention

The present invention generally relates to computer systems, particularly to a method of maintaining cache coherency in a multi-processor computer system, while allowing the posting of certain cache operations such that a broadcast of an operation may be delayed but the operation may nevertheless execute immediately, and further relates to more efficient handling of such posted operations.

2. Description of Related Art

Figure 1:
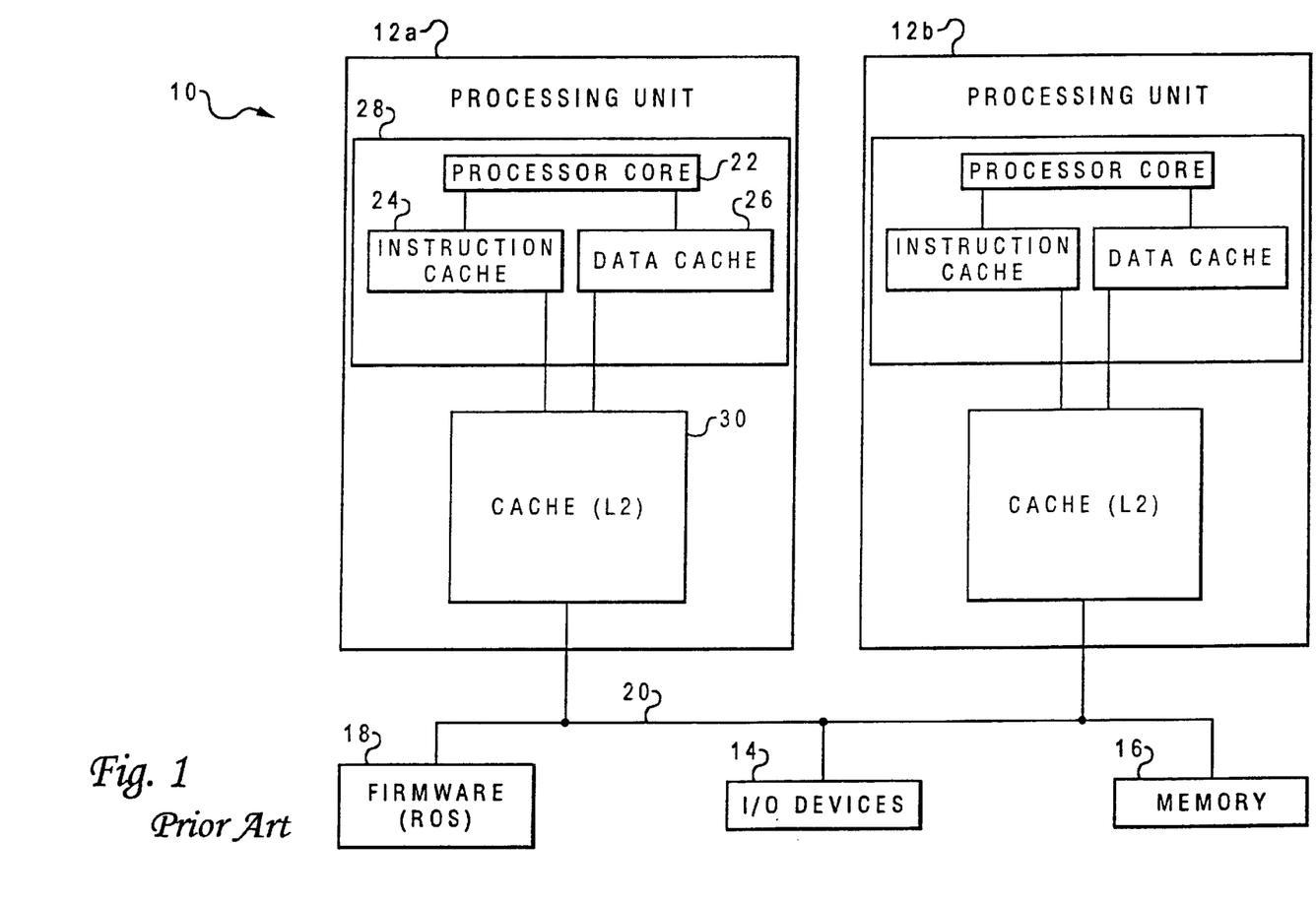
FIG. 1 is a block diagram of a prior art multi-processor computer system.

The basic structure of a conventional multi-processor computer system 10 is shown in FIG. 1. Computer system 10 has several processing units, two of which 12a and 12b are depicted, which are connected to various peripheral devices, including input/output (I/O) devices 14 (such as a display monitor, keyboard, and permanent storage device), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20. Computer system 10 may have many additional components which are not shown, like serial and parallel ports for connection to modems or printers. Those skilled in the art will further appreciate that there are other components that might be used in conjunction with those shown in the block diagram of FIG. 1; a display adapter might be used to control a video display monitor, a memory controller can be used to access memory 16, etc. The computer can also have more than two processing units.

In a symmetric multi-processor (SMP) computer, all of the processing units are generally identical, that is, they all use a common set or subset of instructions and protocols to operate, and generally have the same architecture. A typical SMP architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corp. The processing unit can also have one or more caches, typically an instruction cache 24 and a data cache 26, which are implemented using high speed memory devices. Caches are commonly used to temporarily store values (instructions and/or data) that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data between the processor core and the cache memory.

A processing unit can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. Cache 30 may be a chip having a storage capacity of 256 or 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels (L3, L4, etc.) of serially connected caches.

In an SMP computer, it is important to provide a coherent memory system, that is, to cause write operations to each individual memory location to be serialized in some order for all processors. Assuming that a location in memory is modified by a sequence of write operations to take on the specific successive values of "1," "2," "3," and "4," in a cache coherent system all processors will observe the writes to the given location to take place in the order shown. However, it is possible for a processing element to miss a write to the memory location. A given processing element reading the memory location could see the sequence 1, 3, 4, missing the update to the value 2. A system that implements these properties is said to be "coherent". Virtually all coherency protocols operate only to the granularity of the size of a cache block. That is to say, the coherency protocol controls the movement of and write permissions for data on a cache block basis and not separately for each individual memory location.

There are a number of protocols and techniques for achieving cache coherence that are known to those skilled in the art. At the heart of all these mechanisms for maintaining coherency is the requirement that the protocols allow only one processor to have a "permission" that allows a write to a given memory location (cache block) at any given point in time. As a consequence of this requirement, whenever a processing element attempts to write to a memory location, it must first inform all other processing elements of its desire to write the location and receive permission from all other processing elements to carry out the write. The key issue is that all other processors in the system must be informed of the write by the initiating processor before the write occurs. Furthermore, if a block is present in the L1 cache of a given processing unit, it is also present in the L2 and L3 caches of that processing unit. This property is known as inclusion.

To implement cache coherency in a system, the processors communicate over a common generalized interconnect (i.e., bus 20). The processors pass messages over the interconnect indicating their desire to read or write memory locations. When an operation is placed on the interconnect, all of the other processors "snoop" (monitor) this operation and decide if the state of their caches can allow the requested operation to proceed and if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

This communication is necessary because, in systems with caches, the most recent valid copy of a given block of memory may have moved from the system memory 16 to one or more of the caches in the system (as mentioned above). If a processor (say 12a) attempts to access a memory location not present within its cache hierarchy, the correct version of the block, which contains the actual (current) value for the memory location, may either be in the system memory 16 or in one of more of the caches in another processing unit, such as processing unit 12b. If the correct version is in one or more of the other caches in the system, it is necessary to obtain the correct value from the cache(s) in the system instead of system memory.

For example, consider a processor, say 12a, attempting to read a location in memory. It first polls its own L1 cache (24 or 26). If the block is not present in the L1 cache, the request is forwarded to the L2 cache (30). If the block is not present in the L2 cache, the request is forwarded on to lower cache levels, like the L3 cache. If the block is not present in the lower level caches, the request is then presented on the generalized interconnect (20) to be serviced. Once an operation has been placed on the generalized interconnect, all other processing units snoop the operation and determine if the block is present in their caches. If a given processing unit has the block of data requested by processing unit in its L1 cache, and that data is modified, by the principle of inclusion the L2 cache and any lower level caches also have copies of the block (however, their copies are stale, since the copy in the processor's cache is modified). Therefore, when the lowest level cache (e.g., L3) of the processing unit snoops the read instruction, it will determine that the block requested is present and modified in a higher level cache. When this occurs, the L3 cache places a message on the generalized interconnect informing the processing unit that it must "retry" its operation again at a later time, because the actual value of the memory location is in the L1 cache at the top of the memory hierarchy and must be retrieved to make it available to service the read request of the initiating processing unit.

Once the request from an initiating processing unit has been retried, the L3 cache begins a process to retrieve the modified data from the L1 cache and make it available at the L3 cache, main memory or both, depending on the exact details of the implementation which are not specifically relevant to this invention. To retrieve the block from the higher level caches, the L3 cache sends messages through the inter-cache connections to the higher level caches, requesting that the block be retrieved. These messages propagate up the processing unit hierarchy until they reach the L1 cache and cause the block to be moved down the hierarchy to the lowest level (L3 or main memory) to be able to service the request from the initiating processing unit.

The initiating processing unit eventually re-presents the read request on the generalized interconnect. At this point, however, the modified data has been retrieved from the L1 cache of a processing unit and the read request from the initiating processor will be satisfied. The scenario just described is commonly referred to as a "snoop push". A read request is snooped on the generalized interconnect which causes the processing unit to "push" the block to the bottom of the hierarchy to satisfy the read request made by the initiating processing unit.

The essential point is that, when a processor wishes to read or write a block, it must communicate that desire with the other processing units in the system in order to maintain cache coherence. To achieve this, the cache coherence protocol associates with each block in each level of the cache hierarchy, a status indicator indicating the current "state" of the block. The state information is used to allow certain optimizations in the coherency protocol that reduce message traffic on the generalized interconnect and the inter-cache connections. As one example of this mechanism, when a processing unit executes a read it receives a message indicating whether or not the read must be retired later. If the read operation is not retried, the message usually includes information allowing the processing unit to determine if any other processing unit also has a still active copy of the block (this is accomplished by having the other lowest level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive". If a block is marked exclusive it is permissible to allow the processing unit to later write the block without first communicating with other processing units in the system because no other processing unit has a copy of the block. Therefore, it is possible for a processor to read or write a location without first communicating this intention onto the interconnection, but only where the coherency protocol has insured that no other processor has an interest in the block.

Figure 2:
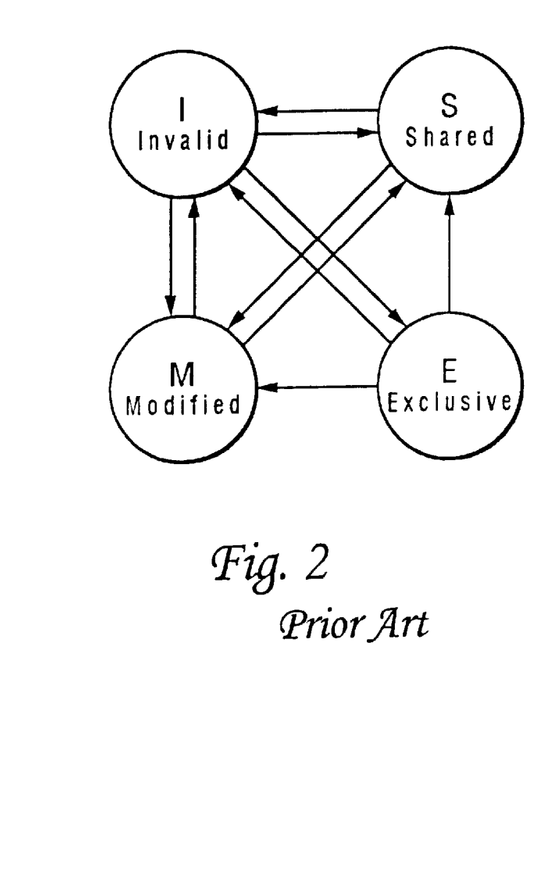
FIG. 2 is a state diagram depicting a prior art cache coherency protocol (MESI)

The foregoing cache coherency technique is implemented in one prior art protocol referred to as "MESI," and illustrated in FIG. 2. In this protocol, a cache block can be in one of four states, "M" (Modified), "E" (Exclusive), "S" (Shared) or "I" (Invalid). Under the MESI protocol, each cache entry (e.g., a 32-byte sector) has two additional bits which indicate the state of the entry, out of the four possible states. Depending upon the initial state of the entry and the type of access sought by the requesting processor, the state may be changed, and a particular state is set for the entry in the requesting processor's cache.

When a block is in the Modified state, the addressed block is valid only in the cache having the modified block, and the modified data has not been written back to system memory. When a block is Exclusive, it is present only in the noted block, and is consistent with system memory. If a block is Shared, it is valid in that cache and in at least one other cache, all of the shared blocks being consistent with system memory. Finally, when a block is Invalid, it means that any resident value is not valid with respect to any corresponding address indicated for the block, i.e., the value is not consistent with system memory. As seen in FIG. 2, if a block is in any of the Modified, Shared or Invalid states, it can move between the states depending upon the particular bus transaction. While a block in an Exclusive state can move to any other state, a block can only become Exclusive if it is first Invalid. A cache's block can become Invalid (e.g., from the Shared state) if the cache snoops an operation from a different processor indicating that the value held in the cache block is to be modified by the other processor, such as by snooping a read-with-intent-to-modify (RWITM) operation.

Some processor architectures, including the PowerPC™ processor, allow the execution of one or more special operations, other than the RWITM operation, when a processor wants to claim a memory block for a future store instruction (modifying the block). The "DClaim" operation is one example. This operation is used in lieu of the RWITM bus transaction when a valid value for the subject block is already held in the same processor's cache, e.g., in a Shared state (if the value were currently held in a Modified or Exclusive state, there would be no need to broadcast either a RWITM or DClaim request since the processor would already have exclusive control of the block). The processor may be adapted to execute a DClaim operation initially, by examining its on-board (L1) cache to see if the valid value is resident there. If not, the processor can issue a RWITM request, and any lower level cache having the valid value will, upon receiving the RWITM request, convert it into a DClaim operation to be passed to the system bus. The DClaim operation accordingly is an address-only operation since the value does not need to be read (from system memory or any intervening cache). Because of this attribute, the DClaim operation is more efficient than a RWITM operation, which would force the read operation across the system bus. When another cache has the same addressed block in a valid (Shared) state and snoops a DClaim transaction for the block, that other cache switches its corresponding block to an Invalid state, releasing the block so that the requesting processor can proceed to modify the value. In other words, a DClaim transaction appears just like a RWITM operation from a snooper perspective.

One problem with DClaim-type operations is that they occasionally (sometimes frequently) suffer significant performance degradation, since completion of the operation can be delayed by coherency responses from other devices in the memory hierarchy. For example, if several caches of different processing units are holding a value in Shared states and they snoop a DClaim operation, their respective processors may repeatedly issue retry messages in response to the DClaim snoop (if these processors are currently busy or otherwise unable to handle the snoop, for whatever reason). This outcome means that the processor of the cache issuing the DClaim request must effectively halt processing of the associated program instruction set (an instruction "thread"), since the processor cannot complete the desired store of the modified value until the DClaim request is re-issued, possibly repeatedly, and appropriate (non-retry) responses are received from all other caches. A significant delay might also occur due to the operation having to wait in line in the cache operation queue.

The same problems can occur with a typical RWITM operation, but with a DClaim operation it might actually be unnecessary to wait to execute the DClaim store. Every other cache (including those responding with "retry") must have the targeted block in either the Invalid state or the Shared state. If the cache block were Invalid, then the eventual response ("null" or "clean") would not interfere with the operation. If the cache block were Shared, and presuming that none of the other processors were contemporaneously issuing DClaim requests for the same block, it would be unnecessary for the initiating processor to wait to execute the DClaim store instruction, since no other action would be required of the responding caches before the DClaim operation could properly complete. Unfortunately, the prior art does not provide any method of knowing or ensuring that no other Shared cache blocks are attempting to execute conflicting DClaim operations at approximately the same time.

If two or more caches hold a value in the Shared state and they do issue DClaim requests simultaneously or nearly simultaneously (i.e., they attempt to cross-invalidate each other), then a deadlock can occur wherein each associated processor becomes ensnared in an endless cycle of retry responses. One method for handling such pipeline collisions is to modify the coherency protocol to preclude a cache from issuing a retry response to a DClaim request if that cache itself has an outstanding DClaim request for the same block and a response to the latter request has not been received yet. In other words, if a cache having a Shared block has issued a DClaim request and has not yet received appropriate responses allowing completion of the store instruction, and it snoops a second DClaim request from another cache for the same block, then it must not retry the second Dclaim until it has received null responses for its own request.

These problems can be especially acute where the processing environment is such that a significant number of memory blocks end up getting shared among at least two processors. Other factors can compound the problems, such as when the processing system allows read-write operations to be atomized using load-and-reserve instructions (in the PowerPC™ instruction set, "lwarx" for 32-bit implementations and "ldarx" for 64-bit implementations) followed by associated conditional store instructions ("stwcx" for 32-bit implementations and "stdcx" for 64-bit implementations). The conditional store instructions can result in delayed DClaim operations, possibly nullifying the benefits of attempting to atomize the read-write operation.

The foregoing problems are also exacerbated by the fact that it might be unnecessary to broadcast a DClaim request (and therefore unnecessary to handle subsequent responses and replies). An example is the eviction of the value from the cache of the processor which issued a particular DClaim operation, as described above, that does not require waiting for responses. An eviction can result when the processor executes other instructions from other threads, such that other unrelated values must be loaded in the cache and displace (cast out) one or more existing blocks. The eviction algorithm, such as a least recently used (LRU) algorithm, might pick a block for eviction that is the subject of a recent DClaim operation. The block may be cast out in a burst write operation. In such cases (and again presuming that none of the other processors were contemporaneously issuing DClaim requests for the same block), the DClaim operation becomes extraneous, since the write operation would be broadcast to any other caches having the Shared value, and so those other cache blocks would switch to Invalid anyway. Conventional cache coherency protocols cannot eliminate such redundant broadcasts.

In light of the foregoing problems, it would be desirable to provide a method of handling DClaim-type operations which did not require an initiating processor to wait for unnecessary cache responses. It would be further advantageous if the method could avoid deadlocks without losing the benefits of the DClaim operation, or could eliminate unnecessary DClaim operations which had become moot as a result of intervening events.

SUMMARY OF THE INVENTION

It is therefore one object of the present invention to provide an improved cache to be used by a processor of a computer system.

It is another object of the present invention to provide a protocol to maintain cache coherency in a multi-processor system, and to allow a processor in the system to proceed with certain operations without waiting for unnecessary coherency responses.

It is yet another object of the present invention to provide a method of eliminating cache coherency operations which become unnecessary due to intervening processing.

The foregoing objects are achieved in a method of avoiding deadlocks in a multi-processor computer system between two or more caches which are sharing a value corresponding to a system memory block, generally comprising the steps of, loading a value corresponding to a memory block of a system memory device into a plurality of cache blocks of respective processing units, assigning a first cache coherency state having a first collision priority to a single one of the plurality of cache blocks, and assigning one or more additional cache coherency states having one or more additional collision priorities which are lower than the first collision priority, to all of the remaining plurality of cache blocks other than the single cache block. A first system bus code can be issued to indicate that the first cache block is requesting modification of the memory block, while a second system bus code, different from the first system bus code, can be issued to indicate that the second cache block is requesting modification of the memory block. The invention also allows folding or elimination of certain redundant cache operations, by loading a first cache operation in the cache operations queue to request modification of a value for a cache block already held in a cache associated with the queue, loading a second cache operation in the cache operations queue to request writing of a new value for the cache block, and removing the first cache operation from the queue in response to said step of loading the second cache operation in the queue. The invention can also be applied in a global versus local manner within a multi-processor computer system having a plurality of processing units grouped into at least two clusters, each processing unit cluster having at least two cache levels wherein a given one of a plurality of caches in the first cache level is used by only a single processing unit, and a given one of a plurality of caches in the second cache level is used by two or more processing units in the same cluster, by assigning a first cache coherency state having a first collision priority to a first cache line of a cache in the first cache level associated with a first processing unit in the first processing unit cluster, and assigning one or more additional cache coherency states having one or more additional collision priorities which are lower than the first collision priority, to one or more additional cache lines of a cache in the first cache level associated with a second processing unit in the second processing unit cluster.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

The present invention is directed to a method of handling cache operations in a memory-coherent, multi-processor system, such as the system of FIG. 1, but the present invention could be applied to computer systems that are not necessarily conventional, i.e., they could include new hardware components not shown in FIG. 1, or have a novel interconnection architecture for existing components (or both). Therefore, the present invention is not limited to the generalized system shown in that figure.

The improved method of the present invention, which utilizes information relating to coherency states of cache blocks, is particularly directed to the handling of cache operations like the PowerPC™ DClaim bus transaction, viz., any type of operation that is used to claim a memory block for a store (write) instruction whenever a valid (current) value for the subject block is already present in a cache of the processing unit which initiated the instruction. While the following description refers specifically to the DClaim operation, the present invention is equally applicable to similar operations which might be implemented with different cache instruction sets, so any reference to the "DClaim" operation should not be construed in a limiting sense. Also, as will become apparent, the present invention may be used at any cache level(s) in a multi-level cache architecture (L1, L2, L3, etc.), although the architecture need not be multi-level. Furthermore, the present invention may be used in multi-processor computer systems other than symmetric multi-processor (SMP) systems; for example, the invention could be applied to a non-uniform memory access (NUMA) system wherein the system memory (RAM) is divided among two or more memory arrays (having separate memory controllers connected to the system bus), and allocated among the processing units.

As discussed in the Description of Related Art, conventional cache coherency protocols are somewhat inefficient in their handling of a DClaim-type operation since they often result in a significant delay in the completion of the DClaim store instruction while waiting for proper coherency responses. The present invention reduces the effects of these adverse results by providing a cache coherency protocol which ensures, in certain instances, that only one cache will persist in any attempt to execute a DClaim-type operation whenever two or more caches are issuing conflicting DClaim operations at approximately the same time.

Figure 3:
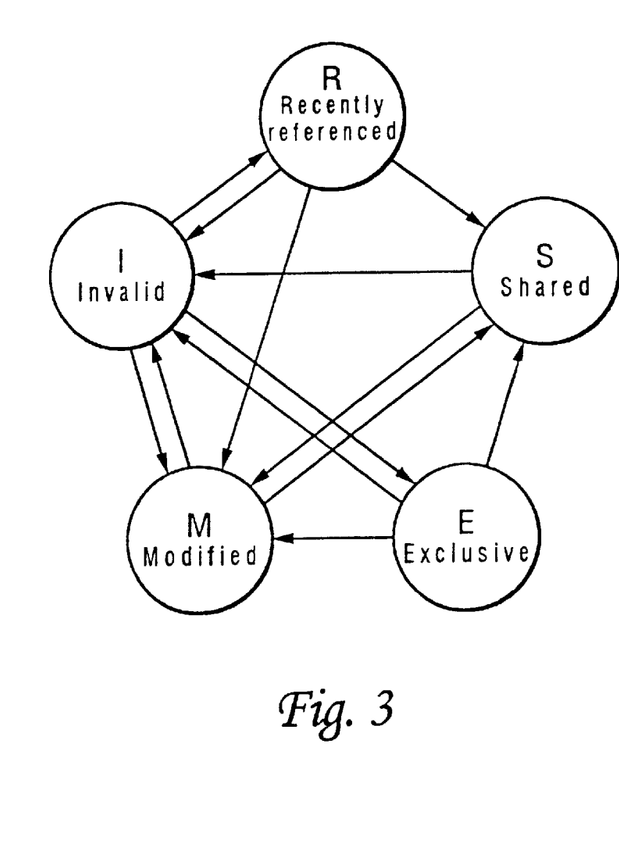
FIG. 3 is a state diagram depicting one embodiment of a cache coherency protocol (R-MESI) that may be used in accordance with the present invention.

With reference now to FIG. 3, there is depicted a state diagram of one embodiment of a cache coherency protocol which may be used to carry out the present invention. This protocol is similar to the prior art MESI protocol of FIG. 2, in that it includes the same four states (Modified, Exclusive, Shared and Invalid), but it also includes a new "R" state (Recent), for providing an indication of the most recently referenced block that would otherwise have a Shared indication. In other words, when two or more caches each hold a valid copy of the same memory block, all of the copies will be in the Shared state except for the single copy in the processing unit which most recently accessed the value, and that copy will be in the Recent state. The R-MESI protocol is described more fully in U.S. patent application Ser. No. 08/839,548 entitled "Cache Coherency Protocol With Recently Read State for Data and Instructions," filed on Apr. 14, 1997, which is hereby incorporated.

By designating a single cache out of all of the other caches at the same level of the memory hierarchy that are concurrently sharing a particular value, the R-MESI protocol elevates that block to a special status, which can then be used for several different purposes. For instance, as discussed in the above-incorporated disclosure, the R-MESI protocol is especially useful in administering "intervention" of a shared value. Intervention allows a cache in a first processing unit to source the current value directly to another cache in a different processing unit (via the system bus, or an alternative interconnect), bypassing the much more protracted step of sourcing the value from system memory. The present invention further takes advantage of this attribute of the basic R-MESI protocol, by granting a higher priority to any block which is in the R state when a DClaim collision occurs. In other words, the R state can be used to ensure that only one cache (at most) will persist in any attempt to secure exclusive control of a previously shared memory address.

A cache block in the R state can effectively obtain priority in any DClaim collision by designing the coherency protocol such that any processing unit having a cache block in the S state will revoke its own pending DClaim request for that block (i.e., convert its request into a RWITM operation) if any conflicting DClaim request from an R state block is snooped before the S state block has received null responses to its own DClaim, but a processing unit will not so revoke its pending DClaim request if it has the relevant block in the R state. It may still be necessary, however, to retry a DClaim request from an R state block in certain cases, such as when the snoop queue is full and the operation cannot be snooped. However, as noted further below, the actual coherency response from the S state snooper is irrelevant with respect to the CPU that resulted in the R block DClaim operation; the main requirement is the withdrawal of any DClaim operation attempted by a cache having the block Shared, if a conflicting DClaim operation is requested by a cache having the block Recent.

In this manner, if a DClaim cross-invalidation is attempted, and one of the caches requesting the DClaim has a block with the current value in the R state, no deadlock occurs. The present invention avoids collision deadlocks (involving R state blocks) while still retaining the benefits of a DClaim-type operation. Such an operation never gets downgraded to a RWITM operation. It is possible that a DClaim collision could occur where the requesting caches have the addressed block only in the S state (there would be an R state cache block somewhere in the system, but it would just not be issuing a contemporaneous DClaim request). In such a case, the prior art collision avoidance technique can be used.

Those skilled in the art will further appreciate that the coherency response of any cache having a block in the S state is often irrelevant to a DClaim request from a corresponding block in the R state block, regardless of whether such Shared caches are issuing conflicting DClaim requests. If there is a conflicting DClaim request, it is resolved as explained above. If there is no pending DClaim request at any Shared cache, then it would issue a null response anyway, and just invalidate its block. The only time an S state block must issue a retry is if its snoop queue is full, so that it can get the operation in the snoop queue later. Accordingly, a CPU store instruction on an R state block incurs no coherency response delay, which might otherwise be particularly significant if any caches with corresponding Shared blocks were busy and had to issue repeated retry messages. Such a DClaim request may be posted (e.g., placed in a cache operations queue) for eventual broadcast to the remainder of the memory hierarchy, but the DClaim store instruction can be completed immediately, which contributes to overall faster operation of the system. This feature is particularly beneficial with multi-level cache architectures, and also results in a significant improvement in the execution of atomic read-write operations which are accomplished using load-and-reserve instructions followed by associated conditional store instructions.

This reduction of coherency response delays may be affected by other cache operations, such as the PowerPC™ "sync" operation which is used to synchronize threads running on different processors, by ensuring that the effects of all operations initiated by one processor have been completely propagated within all other processing elements in the system. A sync broadcast must be retried until after any DClaim from an R block is complete. Such a requirement does not apply to all implementations of the present invention, but it is necessary for this specific PowerPCT™ storage model.

In order to fully implement the foregoing, two different bus codes are provided for the two types of DClaim requests used in this embodiment, namely, the "posted" DClaim which is issued only for R state blocks, and the "regular" DClaim which is issued for S state blocks. If a given cache does not currently contain a valid copy of a value targeted by a DClaim snoop, then its snooper treats these two bus codes in exactly the same manner (for the specific cache coherency protocol depicted in FIG. 3, this situation arises only if the cache block is Invalid, so its snooper would transmit a null message in response to either type of DClaim request). Other coherency protocols may be devised in accordance with the present invention, having more than two states that are "shared" (in the broad sense that a cache block contains a current, valid copy of a value that is also present in a cache block of another processing unit). For any such coherency protocol, more than two types of DClaim requests (i.e., bus codes) may be provided in order to establish more than two different collision priority levels, further enhancing the efficiencies of the present invention.

Figure 4:
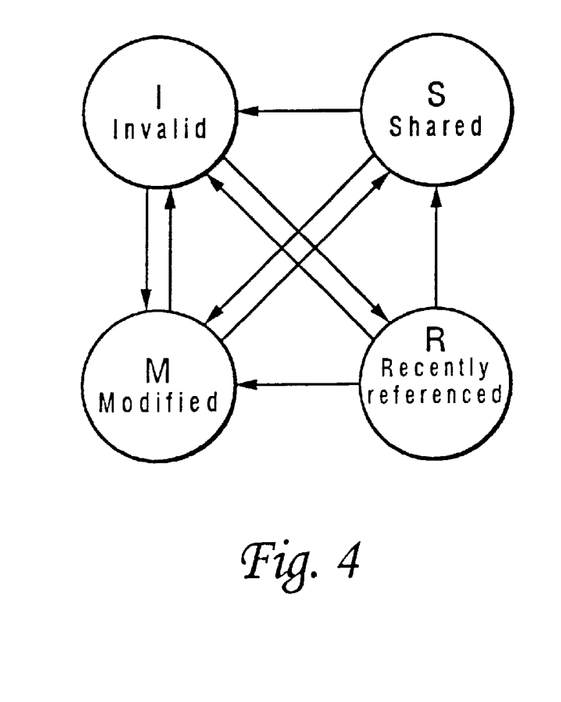
FIG. 4 is a state diagram depicting another embodiment of a cache coherency protocol (MRSI) that may be used in accordance with the present invention.

It can be seen that a cache block in the R state is effectively treated by its associated processor in the same manner as a cache block in the E state would be treated. For either state, the processor (or a higher-level cache) can immediately locate a valid copy of the current value in the lower cache, and the cache block is uniquely designated; that is, for a given address there can only be one cache block that is in the Recent state, or only one cache block that is in the Exclusive state. It is therefore possible to implement the present invention with an alternative coherency protocol that completely omits the Exclusive state. FIG. 4 is a state diagram depicting such an embodiment of an "MRSI" cache coherency protocol wherein the Recent state further functions as a substitute for the Exclusive state.

In this MRSI embodiment, if the current value for a memory block is not located in any cache of the computer system (the value is only stored in system RAM), and a processor issues a read command for the address, then the value will be loaded into the processor's cache(s) and the block(s) labelled with the Recent state, rather than the Exclusive state. The only potential disadvantage in omitting the Exclusive state is that a cache will have to broadcast any modification of an R block, even if no other valid copies of the value are present in other caches; in this embodiment, the R state is ambiguous and so it must be presumed that other shared copies are in use. This broadcast would not be required if the block were in the E state. Nevertheless, in many multi-processor environments the E state would rarely exist due to heavy sharing of data, so the benefit gained by simplifying the coherency states can outweigh the requirement of broadcasting modifications even when the broadcast is unnecessary.

Figure 5:
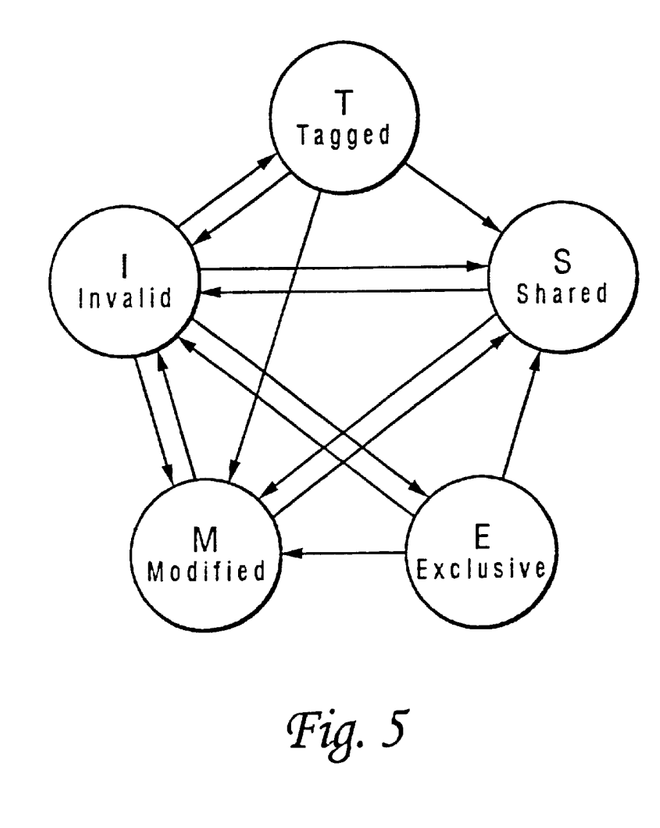
FIG. 5 is a state diagram depicting still another embodiment of a cache coherency protocol (T-MESI) that may be used in accordance with the present invention.

Other protocols can be used with the present invention to designate a single cache block out of a plurality of shared blocks as having a DClaim collision priority. FIG. 5 is a state diagram depicting another embodiment of such a cache coherency protocol. This embodiment is also similar to the prior art MESI protocol of FIG. 2, but it additionally includes a "T" (Tagged) state to indicate that the corresponding value has been modified but not yet written out to system memory. The cache line holding the modified value in the T state is (for the moment, at least) responsible for ensuring that the modified value is eventually written to system memory. The T state is therefore similar to the M state, but the T state is distinguished from the M state to intervene a cache read operation without requiring the involvement of system memory, that is, without system memory reading the modified value during intervention (freeing up bandwidth in the memory controller). When a cache block in the T state sources a value, it then switches to the S state (or to one of many optional states which provide historical cache state information). The cache which receives the value holds it as the new T state cache block. Thus, "ownership" of the T state migrates in a manner similar to the R state. The Tagged state is described more fully in U.S. Pat. application Ser. No. 09/024,393 filed contemporaneously with the present application, and which is hereby incorporated.

As with the R state, for a given memory address there can only be one cache block in the system (horizontally) that is in the T state. Therefore, the foregoing method may be easily adapted to the T state, by still requiring a cache block in the S state (or one of the historical states) to revoke its own pending DClaim request in a collision, but not revoking a DClaim request for a T state block. Two different bus codes are again used for the two variations of the DClaim request, and a DClaim request for a T state block can similarly be posted.

The present invention may further be implemented with a cache coherency protocol which combines elements of different protocols. An "RT-MESI" protocol, described in the aforementioned U.S. patent application Ser. No. 09/024,393 filed contemporaneously with the present application, includes both the R state and the T state as previously described. The same system bus code may be used for posted DClaim operations associated with both R and T state blocks. In this manner, the benefits of the DClaim operation are still achieved for collisions which involve either the R or T state.

Figure 6:
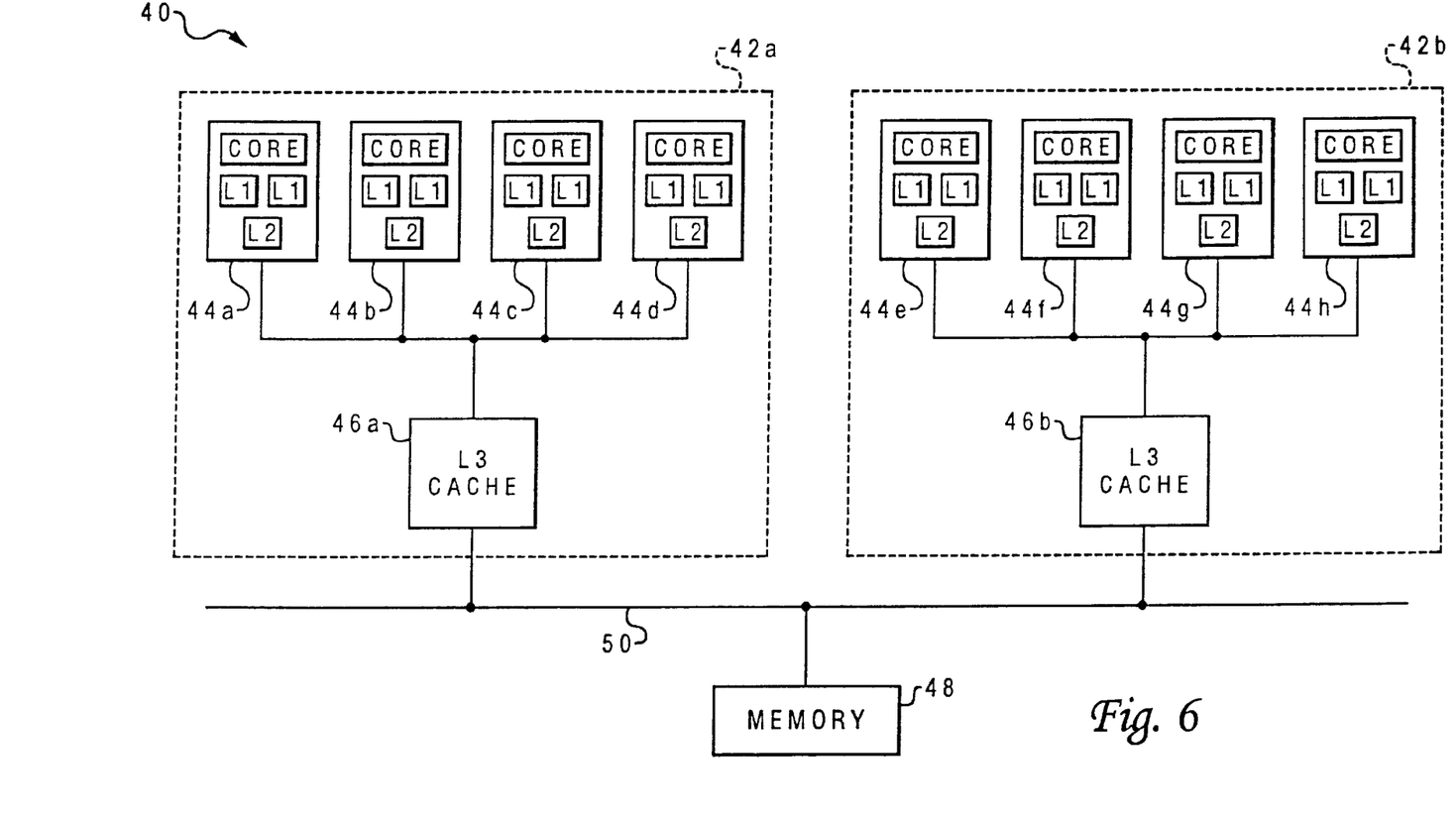
FIG. 6 is a block diagram of one embodiment of a multi-processor computer system having a multi-level cache architecture that may be used to implement the present invention on both a global scale (system wide) and a local scale (CPU cluster)

Referring now to FIG. 6, one embodiment 40 of a multi-processor computer system having a multi-level cache architecture is depicted which may be used to implement the present invention on both a global scale (system wide) and a local scale (CPU cluster). Multi-processor computer system 40 includes two CPU clusters 42a and 42b. CPU cluster 42a has four CPU's 44a, 44b, 44c, and 44d, each having a processor core with on-board (L1) instruction and data caches, and an L2 cache. The L2 caches of these four CPUs 44a, 44b, 44c, and 44d are connected to a shared L3 cache 46a, which is connected to the system memory (RAM) 48 via the generalized interconnect, or bus, 50. CPU cluster 42b similarly has four CPU's 44e, 44f, 44g, and 44h, each also having a processor core with on-board (L1) instruction and data caches, and an L2 cache. The L2 caches of these four CPUs 44e, 44f, 44g, and 44h are connected to another shared L3 cache 46b, which is again connected to memory 48 via bus 50. In this hierarchical variation of the R-MESI protocol, up to three corresponding cache lines can be found in the Recent state: one cache line among the L2 caches of CPUs 44a, 44b, 44c, and 44d; one cache line among the L2 caches of CPUs 44e, 44f, 44g, and 44h; and one cache line between the two L3 caches 46a and 46b.

Consider the following example, wherein all of the corresponding cache lines in CPUs 44a–44h begin in the Invalid state. Processor 44a executes a read operation, and so its cache line (L2) goes from an Invalid state to a Recent state; the corresponding cache line in L3 cache 46a also goes from Invalid to Recent. Thereafter, processor 44b requests a read of the cache line; processor 44a intervenes and its cache line (L2) switches to the Shared state, while the cache line (L2) of processor 44b goes from the Invalid state to the Recent state. The cache line in L3 cache 46a remains Recent. Later, processor 44e requests a read of the cache line; processor 44b intervenes, but its cache line (L2) remains in the Recent state, since it is in a different CPU cluster from processor 44e. The cache line (L2) in processor 44e nonetheless switches from the Invalid state to the Recent state. Also, since the intervened value has passed through both L3 caches, the cache line in L3 cache 46a switches from Recent to Shared, and the cache line in L3 cache 46b switches from Invalid to Recent. Thereafter, if processor 44f requests a read of the cache line, it can be sourced by the cache line (L2) of processor 44e. In such a case, the cache line (L2) of processor 44e switches from the Recent state to the Shared state, and the cache line (L2) of processor 44f switches from the Invalid state to the Recent state. These steps are illustrated in Table 1:

TABLE 1

|  | $L2_{44a}$ | $L2_{44b}$ | $L2_{44e}$ | $L2_{44f}$ | $L3_{46a}$ | $L3_{46b}$ |
|---|---|---|---|---|---|---|
| Initial States | I | I | I | I | I | I |
| $P_{44a}$ Read | R | I | I | I | R | I |
| $P_{44b}$ Read | S | R | I | I | R | I |
| $P_{44e}$ Read | S | R | R | I | S | R |
| $P_{44f}$ Read | S | R | S | R | S | R |

In the last row of Table 1, each CPU cluster has one cache line in the "R" state, and one of the L3 caches has a line in the "R" state as well. Since a particular block can be held in the R state by more than one cache in a given horizontal level, this implementation of the R-MESI protocol requires further refinement to be able to designate only one of possibly many R state L2 blocks for collision priority, and thereby support the present invention. This refinement may come in the form of a special R state, hereinafter referred to as the global R state or "$R_G$." This state is applied to only one block in a given level of the cache hierarchy, namely, to the most recently read block among all caches in the global system, not just with reference to the local CPU cluster. For example, in the embodiment of FIG. 6, only one $R_G$ block can be assigned among all of the L2 caches in both processing units 42a and 42b (this state is not used in the L3 caches of this embodiment since it is unnecessary). Table 2 illustrates how the $R_G$ state would apply for the same sequence of operations described for Table 1:

TABLE 2

|  | $L2_{44a}$ | $L2_{44b}$ | $L2_{44e}$ | $L2_{44f}$ | $L3_{46a}$ | $L3_{46b}$ |
|---|---|---|---|---|---|---|
| Initial States | I | I | I | I | I | I |
| $P_{44a}$ Read | $R_G$ | I | I | I | R | I |
| $P_{44b}$ Read | S | $R_G$ | I | I | R | I |
| $P_{44e}$ Read | S | R | $R_G$ | I | S | R |
| $P_{44f}$ Read | S | R | S | $R_G$ | S | R |

In such a global/local cache hierarchy, only the $R_G$ state can be posted (not the plain R state), for reasons similar to those described above with respect to the RT-MESI protocol. This concept can be extended to cache architectures having even more than three cache levels. It is also applicable to a global/local hierarchy using T-MESI instead of R-MESI (or using RT-MESI).

Figure 7:
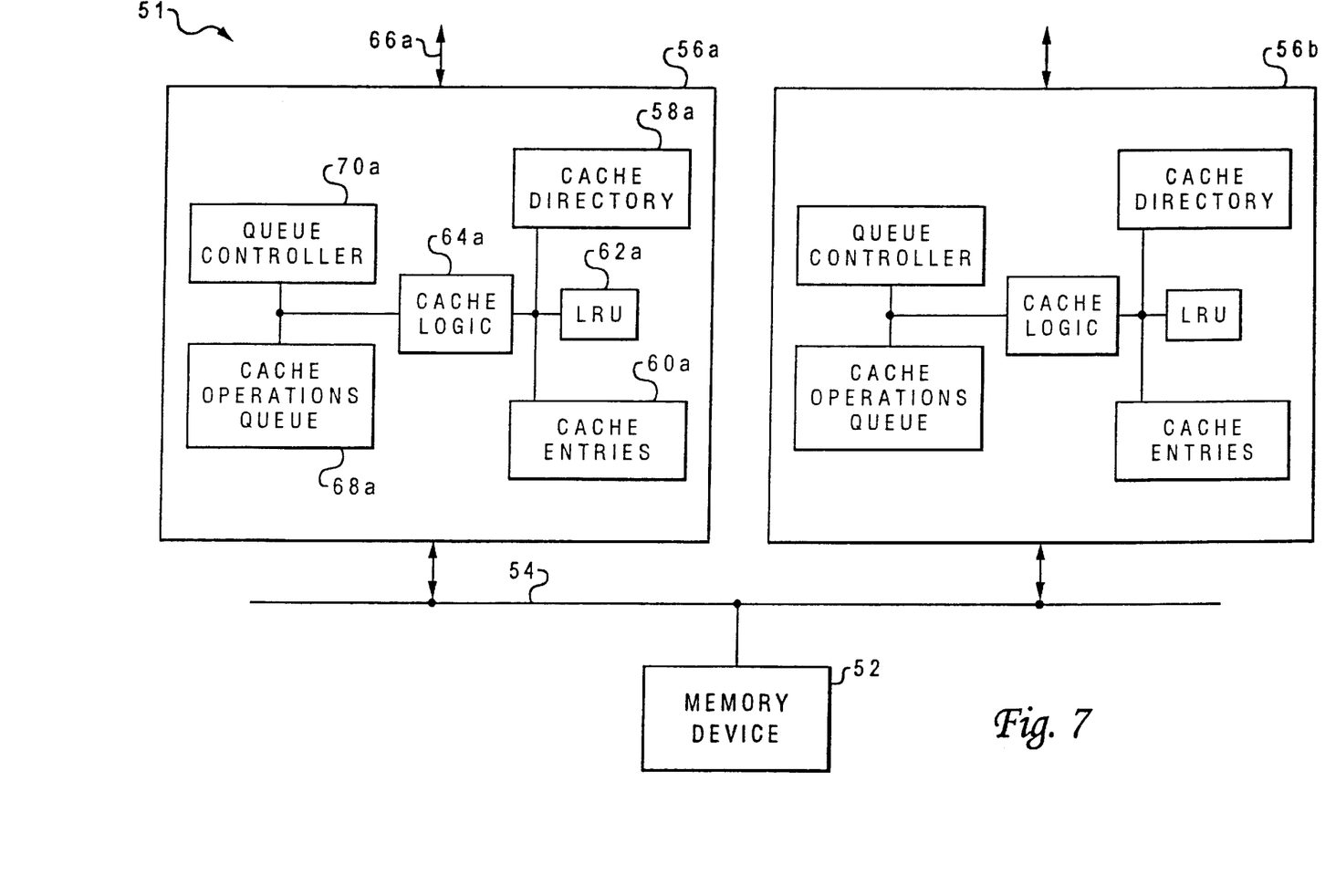
FIG. 7 is a block diagram of one embodiment of a cache construction which may be used in accordance with the present invention to streamline a cache operations queue.

As noted in the Description of Related Art, conventional cache coherency protocols are also inefficient in their handling of DClaim-type operations since they force the complete execution of all such operations (broadcast of the operation and evaluation of responses) even if those operations have become unnecessary or redundant. In the case where a value is cast out of a cache which just issued a DClaim request, a broadcast of the request becomes extraneous since the write operation will be broadcast anyway. FIG. 7 is a block diagram of one embodiment 51 of a memory hierarchy which may be used in accordance with the present invention to mitigate such inefficient handling of a DClaim-type broadcast.

Memory hierarchy 51 includes a memory device 52 (e.g., RAM) connected to a system bus 54, and two caches 56a and 56b which are also connected to system bus 54. In the preferred embodiment, each cache 56a, 56b is identical. The memory hierarchy may further include additional caches if more than two processors are provided in the multi-processor computer system. Cache 56a has a cache directory 58a, a cache entry array 60a, an LRU unit 62a, and appropriate logic 64a to write to the cache lines in directory 58a and array 60a, to detect cache hits, and to read stored values. The cache is connected to the processor, or a processor side of the memory hierarchy, by processor bus 66a.

Cache 56a further has one or more queues, including at least one cache operations queue 68a. Cache operations queue 68a contains a serialized list of cache operations, each of which results in a bus transaction, i.e., an operation that must be broadcast to system bus 54 (or to a bus on the system memory side of the memory hierarchy if the cache is at a higher lever in the cache architecture). A queue controller 70a includes appropriate logic to associatively compare current entries in queue 68a to a new entry which is to be loaded in the queue. If the results of the comparison indicate that a current entry is redundant or unnecessary in light of a new entry, then the current entry is dynamically folded or collapsed into the new entry, i.e., the current entry is eliminated or deleted from queue 68a without broadcasting its associated bus operation.

Consider the following example, wherein a DClaim operation is first issued by a processor (or a higher level cache) associated with cache 56a, in order to claim exclusive ownership of a particular memory block which is currently held in the R (or $R_G$) state. This posted DClaim operation is placed in queue 68a. Shortly thereafter (while the posted DClaim operation is still in the queue), the same processor (or higher level cache) issues one or more other instructions such that LRU unit 62a selects for eviction the same cache block that is the subject of the pending Posted DClaim operation. In this case, the value will be written to system memory and the associated write operation will be entered in queue 68a. Queue controller 70a will associatively compare the address of the write operation with the previous entries in queue 68a to determine if an earlier posted DClaim operation was issued for the same address. In this example, the result of the comparison will be positive, so queue controller 70a will remove the posted DClaim operation from queue 68a prior to its being broadcast, and the more recent operations in queue 68a (including the write instruction) will all move up one place.

The cache controller protects the coherency of the cache line which is the subject of a Dclaim operation. Once the target line of a posted DClaim is selected as a victim and the posted Dclaim operation is folded out, the cast-out control logic continues to protect the line from other access attempts (that is, retry associated bus transactions) until the cast-out/write-back to memory is completed. The cache controller begins protecting the line as soon as the posted Dclaim operation is placed in queue. Other caches could be in Shared states, so the cast-out operation takes over protecting the line.

The dynamic folding of a pending cache operation into a new queue entry can significantly reduce address operations on system bus. From the cache controller's perspective, the collapsed operation was fully executed, but it required no latency. The advantages increase with increasing depth of the cache operations queue. In the depicted embodiment the cache operation queue is eight deep. The logic required for queue controller 68a to make the comparison and remove posted DClaim requests is relatively simple, particularly in relation to the benefits achieved.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, this protocol can be used with features from coherency protocols other than, or in addition to, those discussed above, including the "HRT-MESI" protocol, described in U.S. patent application Ser. No. 09/024,319 entitled "Cache Coherency Protocol Having Hovering (H), Recent (R) and Tagged (T) States," filed contemporaneously with the present application, which combines a "Hover" state with the aforementioned R and T states. It is therefore contemplated that such modifications can be made without departing from the spirit or scope of the present invention as defined in the appended claims.

What is claimed is:

1. A method of avoiding deadlocks in a multi-processor computer system between two or more caches which are sharing a value, comprising the steps of:

loading a value into a plurality of cache blocks of respective processing units, wherein said cache blocks correspond to a memory block of a system memory device, and the value in the cache blocks is modified from a current value in the memory block;

assigning a first cache coherency state having a first collision priority to a single one of the plurality of cache blocks;

assigning one or more additional cache coherency states having one or more additional collision priorities which are lower than the first collision priority, to all of the remaining plurality of cache blocks other than the single cache block;

issuing a first request associated with one of the remaining cache blocks to claim the memory block for future modification;

issuing a second request associated with the single cache block to claim the memory block for future modification, such that the second request conflicts with the first request; and withdrawing the first request in response to the second request.

2. The method of claim 1 wherein:

said step of loading the modified value into the plurality of cache blocks includes the step of copying the modified value into the single cache block after the modified value has been loaded into the remaining cache blocks; and said step of assigning the first cache coherency state is performed in response to said copying step.

3. The method of claim 1 wherein said loading step includes the steps of:
sourcing the modified value from the system memory device to a first one of the plurality of cache blocks;
assigning an exclusive cache coherency state to the first cache block in response to said sourcing step;
copying the modified value into the single cache block after the modified value has been sourced to the first cache block; and
switching the assignment of the first cache block from the exclusive cache coherency state to the one or more additional cache coherency states in response to said copying step.

4. The method of claim 1 further comprising the step of writing the modified value to the memory block.

5. The method of claim 2 wherein:
at least one of the remaining cache blocks had been assigned the first coherency state prior to said step of assigning the first coherency state to the single cache block; and
said step of assigning the one or more additional cache coherency states includes the step of changing the assignment of the at least one of the remaining cache blocks from the first cache coherency state to the one or more additional cache coherency states as the modified value is loaded into the single cache block.

6. The method of claim 3 wherein said copying step is performed by copying the modified value from the first cache block.

7. The method of claim 1 further comprising the step of completing a store instruction associated with the second request, without waiting for any response to the second request.

8. The method of claim 7 further comprising the steps of:
assigning a modified cache coherency state to the single cache block in response to the second request; and
assigning an invalid cache coherency state to the remaining cache blocks in response to the second request.

9. A computer system comprising:
a memory device;
a bus connected to said memory device;
a plurality of processing units connected to said bus, each processing unit having a cache with at least one cache block; and
cache coherency means for assigning a first cache coherency state having a first collision priority to a single cache block among a plurality of said cache blocks sharing a value which is associated with a corresponding memory block of said memory device, wherein the value in the cache blocks is modified from a current value in the memory block, and assigning one or more additional cache coherency states having one or more additional collision priorities which are lower than said first collision priority, to all remaining cache blocks in said plurality of cache blocks other than said single cache block which share the modified value, wherein said cache coherency means further ensures when a given cache of said remaining cache blocks issues a first request to claim said corresponding memory block for future modification and a cache of said single block issues a second, conflicting request to similarly claim said corresponding memory block for future modification, that said given cache withdraws said first request in response to said second request.

10. The computer system of claim 9 wherein:
the modified value is copied into said single cache block after the modified value has been loaded into said remaining cache blocks; and
said cache coherency means assigns said first cache coherency state as the modified value is copied into said single cache block.

11. The computer system of claim 9 wherein said cache coherency means provides at least three coherency states for other cache blocks which do not share the modified value, including:
an invalid state;
an exclusive state; and
a modified state.

12. The computer system of claim 9 wherein said cache coherency means further provides for intervention of the modified value by sourcing the modified value from said single cache block.

13. The computer system of claim 9 wherein said first cache coherency state is a tagged state.

14. The computer system of claim 9 wherein said cache coherency means allows completion of a store instruction associated with said second request, without waiting for any response to said second request.

15. The computer system of claim 13 wherein said cache coherency means further provides for intervention of the modified value by sourcing the modified value from said single cache block.

16. The computer system of claim 15 wherein said cache coherency means provides at least three coherency states for other cache blocks which do not share the modified value, including:
an invalid state;
an exclusive state; and
a modified state.

* * * * *